United States Patent [19]
Bristor

[11] Patent Number: 5,842,223
[45] Date of Patent: Nov. 24, 1998

[54] METHOD AND APPARATUS FOR INFORMATION STATE MANAGEMENT

[75] Inventor: David M. Bristor, Menlo Park, Calif.

[73] Assignee: Sun Microsystems Inc., Palo Alto, Calif.

[21] Appl. No.: 497,526

[22] Filed: Jul. 3, 1995

[51] Int. Cl.$^6$ ................................................. G06F 17/30
[52] U.S. Cl. ......................... 707/204; 707/100; 707/101; 707/103
[58] Field of Search ........................ 395/185.05, 185.02, 395/614, 600, 650; 707/100, 101, 103, 204

[56] References Cited

U.S. PATENT DOCUMENTS

| | | | |
|---|---|---|---|
| 5,291,593 | 3/1994 | Abraham et al. | 395/650 |
| 5,295,263 | 3/1994 | Kojima et al. | 395/600 |
| 5,379,423 | 1/1995 | Mutoh et al. | 395/600 |
| 5,526,519 | 6/1996 | Maruyama et al. | 395/600 |
| 5,634,124 | 5/1997 | Khoyi et al. | 395/614 |

*Primary Examiner*—Thomas G. Black
*Assistant Examiner*—Cheryl Lewis
*Attorney, Agent, or Firm*—James D. Ivey

[57] ABSTRACT

Data elements which can be combined to define a state are defined by respective attributes of an attribute set. An attribute includes an identifier, a data type, an accessor, and procedures for storing and retrieving values of the data element. A context includes at most one value for each attribute of an attribute set. Different contexts can have different respective values for the same attribute. Since an attribute includes a data type and procedures for storing and retrieving values of the attribute, type checking error detection mechanisms of the computer instruction language in which the attributes are implemented remain in effect. In addition, attribute values are stored in an ordered structure, e.g., an ordered list, in each context and the location within the ordered structure at which an attribute value corresponding to a particular attribute is stored in the particular attribute. As a result, attribute values are accessed within contexts in a particularly efficient manner. Attribute sets are extensible at run time such that attributes can be added to an attribute list during execution of a computer process in which the attribute set is implemented.

71 Claims, 3 Drawing Sheets

METHOD AND APPARATUS FOR INFORMATION STATE MANAGEMENT

FIELD OF THE INVENTION

The present invention relates to methods for organizing information stored in a computer system and, in particular, to sets of name/value pairs which are dynamically expandable, which provide for enhanced error detection, and which are particularly efficient to access.

BACKGROUND OF THE INVENTION

Property lists are commonly used in computer processes to manage information generally known as properties. Properties of a particular property list typically are informational components of (and therefore define) a state, e.g., of a thing or object. A property has a name, sometimes referred to herein as a property name, and a value, sometimes referred to herein as a property value. Property lists are typically unordered lists of properties, i.e., of property name/property value pairs. For example, a computer process can store in a property list data representing the state of a person and including properties specifying the person's age, weight, height, name, social security number, residential address, postal address, and electronic mail address.

Conventional property lists provide advantages of flexibility in that they can generally be expanded during execution of a computer process to include additional properties. Property lists are also flexible in that the types of data that can be stored as the value of a property in such a list can be unspecified, allowing for storage of properties having property values of different types in a single property list. Largely as a result of the flexibility of property lists, use of such lists has become ubiquitous in computer processes developed today. However, property lists suffer from a number of disadvantages, four of which are specifically discussed herein.

First, property lists are generally organized as unordered lists, e.g., linked lists in which the properties can be in any order. Accordingly, the amount of processing required to locate a desired property in such a list is proportional to the length of the list. This is true since a desired property is located by comparing a given property name to the property name of each property in the list until the given property name matches a property name in the list. Data structures other than unordered lists, e.g., binary trees, can be used to relate properties of such a list to one another to reduce the amount of processing required to locate a desired property. However, such other data structures substantially exacerbate complexity in the structure and accessing of such lists. As a result, property lists are most typically implemented as unordered lists and suffer inefficiency in the access of such lists as described above.

Second, to search a property list, a given property name is repeatedly compared to property names in the list as described above. In general, property names can comport with rules governing composition of valid identifiers within the particular computer instruction language in which the property list is implemented or can be strings of alphanumeric data. Frequently, property names include alphanumeric data and searching property lists involves numerous comparisons of alphanumeric data. In general, alphanumeric comparisons are relatively inefficient. The number of processor clock cycles required to effect an alphanumeric comparison depends on the similarity and the length of the alphanumeric data compared and typically significantly exceeds a single processor clock cycle. Thus, by using alphanumeric comparisons to locate a particular property in a list of properties, greater processing is required to locate such a property.

Third, since the type of data, e.g., integer, floating point number, a string of alphanumeric characters, etc., of the value of the property is unspecified, normal type checking error detection mechanisms of the computer instruction language in which the property list is implemented are rendered ineffective. This disadvantage is best understood by way of the following illustrative example. The following source code excerpt stores a property in a property list.

$$\text{pl.set(``fontSize'', (void *) 12);} \quad (1)$$

In source code excerpt (1), (i) "pi" identifies a property list, (ii) "set" specifies an operation in which a property formed of the two arguments is stored in the identified list, (iii) "fontSize" is the first argument and is the property name of the formed property, and (iv) "12"is the second argument and is the property value of the formed property. Since "12"is not enclosed in quotation marks, the stored value is an integer whose value is twelve (12).

The following source code excerpt retrieves the value associated with the property name "fontSize" within the property list pi and is executed some time after execution of source code excerpt (1).

$$\text{char *fsize=(char *)pl.get(``fontSize'');} \quad (2)$$

In source code excerpt (2), the property value associated with the property name "fontSize" within property list pl is erroneously assumed by the author of source code excerpt (2) to be a pointer to a string of characters. As a result, the property value retrieved from the property list is grossly misinterpreted. Specifically, a pointer to memory address twelve (12) is returned. In almost all computer processes, a memory address of twelve is invalid and access to such a memory address will typically generate an error. Until the pointer to memory address twelve is used to access data at memory address twelve, the error typically goes undetected. At the very least, the data stored at memory address twelve will most certainly not be the property value associated with the property name "fontSize" in the property list pl.

When a very complex computer process, generally including hundreds of thousands of computer instructions, is developed by several computer engineers, ensuring that each reference to each property stored in every property list in such a computer process assumes the appropriate type for the value of the property is largely impracticable. The result of such errors when they go undetected is unpredictable behavior of the computer process which, at best, weakens confidence in the computer process and can cause memory overruns and data loss.

Fourth, conventional property lists generally provide no mechanism by which access to an undefined property can be conclusively recognized as an error. For example, a property value returned by execution of the function "pl.get" when a particular property name is not located within the property list pl is typically nil and can be a valid property value. Nil is, in some computer instruction languages, equivalent to a logical value of false or is sometimes used to specify that a property is inapplicable to a particular instance. For example, a property whose value is a person's driver's license number can have a property value of nil to represent that the person has no driver's license. This case is indistinguishable from a property list in which no property value having a particular property name has been stored in the property list. In the former case, it is known that the person has no driver's license. In the latter case, it is unknown whether the person has no driver's license or whether a property having the particular property name is undefined for the property list. For example, a driver's license number may be properly stored in the property list and associated with the property name "license." If, by an inadvertent error, the property name "license" is specified by a computer instruction in a computer process, the computer process may erroneously determine that the property indicates that the person has no driver's license. As a result, the error could easily go undetected. As a result, the inability to distinguish valid property values from a returned value resulting from the absence of a property in a property list is a serious shortcoming of conventional property lists.

Property lists are becoming relatively ubiquitous in computer processes developed currently. As a result, processing inefficiencies associated with conventional property lists, in aggregation, amount to significant and substantial inefficiencies in such computer processes.

In addition, development of computer processes without errors is particularly difficult when many properties are used in a particularly large computer process which is constructed by several computer engineers since each computer engineer must know the particular type of the value of a particular property to properly access the property value.

What is needed is an apparatus and method for storing a collection of data elements which are informational components of a state and which have respective values of various types together in a single, extensible data structure. What is further needed is such an apparatus and method which enables type checking error detection with respect to access of values stored within the data structure. What is still further needed is such a data structure which is particularly efficient to access and in which the absence of a property from the data structure can be readily distinguished from a valid property value stored within the structure.

SUMMARY OF THE INVENTION

In accordance with the present invention, the definition of a data element (which can be an informational component of a state), as represented in a memory of a computer system, is expanded from a conventional property name to include (i) a name by which the data element is identified, (ii) a data type of the data element, and (iii) procedures for storing and retrieving values of the data element. By including in the definition of a data element the data type of the data element and procedures for storing and retrieving values of the data element, type checking error detection mechanisms provided by the computer instruction language in which the data elements are constructed can be used to ensure that values of the data element are stored and retrieved according to the appropriate data type.

The definition of the state component is called an attribute. Attributes can be combined to define a collection of attributes which is called an attribute set. Attributes have values only in contexts. A context includes a collection of at most one value for each of the attributes of an attribute set. The collection of attribute values in a context is ordered such that values representing a particular attribute in different contexts is located at the same position within each of the collections of attribute values in the respective contexts. In other words, the organization of the various attribute values stored in a context is uniform throughout all contexts of an attribute set. As a result, an attribute value can be accessed in a context by determining the particular location within the context at which the attribute value is stored. The location of an attribute value representing an attribute within a context is specified by an accessor which is included in the attribute. Access to attribute values is therefore particularly efficient.

Since the procedures by which attribute values of a particular attribute are accessed are associated with the attribute and not with the context, an attempt to access a value of an attribute which is not defined produces an error condition by operation of a conventional error detection mechanism of the computer instruction language in which the attribute set, attributes, and contexts are implemented. For additional immunity from computer process design errors, a checked context detects as an error condition an attempted access of a value within the checked context, which is associated with one attribute set, of an attribute which is defined for another attribute set. As a result of these error detection mechanisms, an attribute which is not defined is easily and readily distinguished from an attribute whose value in a particular context is a nil or some other valid data value with a special meaning.

An attribute set is extensible in that attributes can be added to an attribute set during execution of a computer process using the attribute set. Accordingly, components of a computer process can add attributes to an attribute set, and therefore to contexts of the attribute set, as needed. In addition, components of a computer process which are updated to include and use new attributes within a previously existing attribute set are fully compatible with and can be combined with older components of the computer process which contain no reference to or definition of such new attributes. Attributes and attribute sets in accordance with the present invention therefore preserve the flexibility of conventional property lists yet provide substantial improvement in processing efficiency and error immunity.

DETAILED DESCRIPTION

Figure 1:
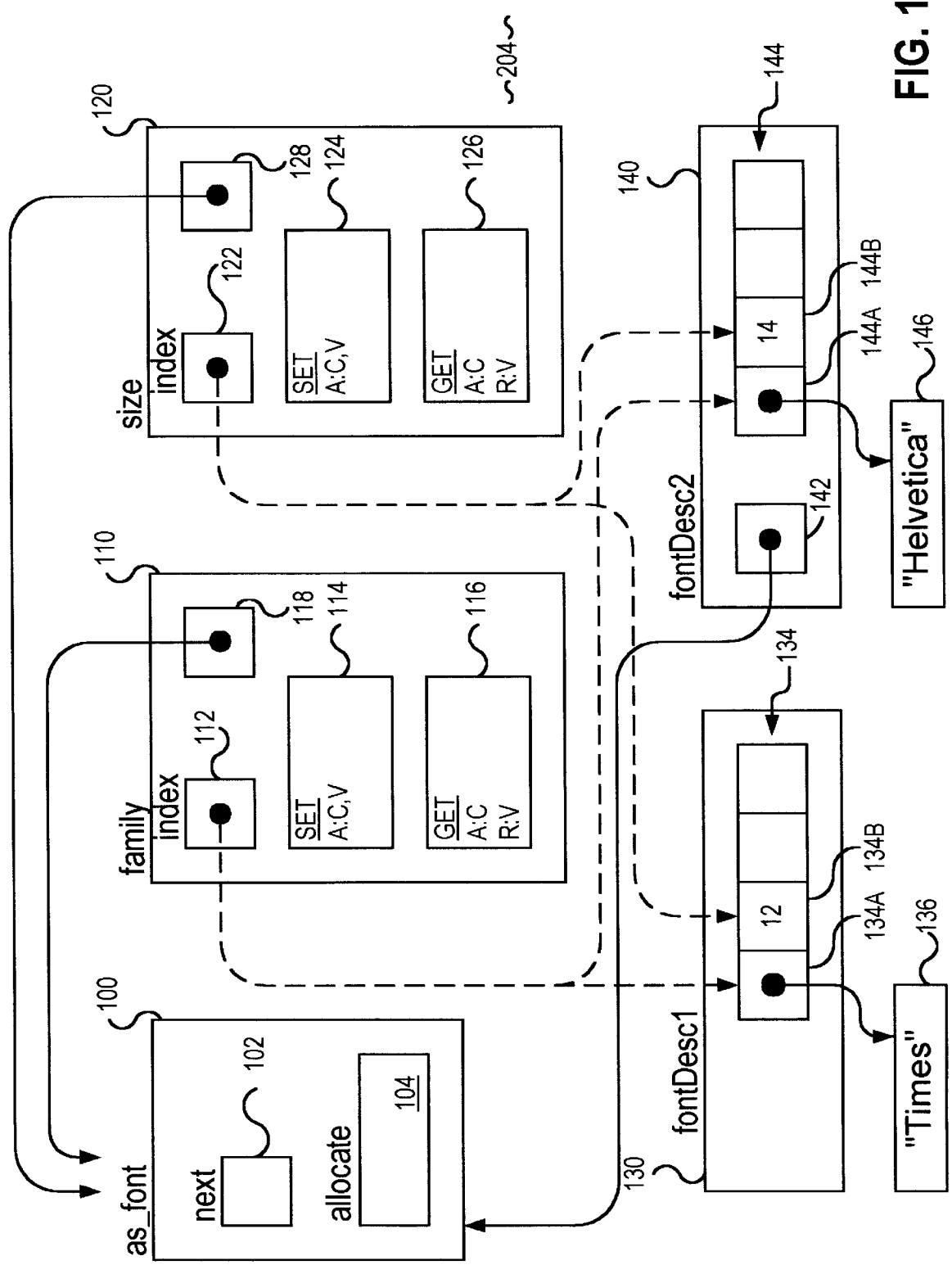
FIG. 1 is a block diagram of an attribute set, attributes of the attribute set, and contexts of the attribute set in a memory of a computer system in accordance with the present invention.

In accordance with the present invention, a data element which can be an informational component of a state is defined by an attribute such that the flexibility of conventional property lists is preserved while substantial improvements in processing efficiency and error immunity are provided without inordinate increases in complexity. In general, flexibility is preserved since attributes can be added to an attribute set during execution of a computer process implementing and using attribute sets, attributes, and contexts in accordance with the present invention. Since attributes can be of any data type supported by the particular computer instruction language in which attribute sets, attributes, and contexts are implemented, flexibility in the application of attributes and attribute sets is further preserved. Substantial improvement in processing efficiency is provided since contexts of a single attribute set store attribute values in a uniform structure which is ordered and in which a particular attribute value can be directly located using an accessor. Accessors are described in greater detail below. Error immunity in implementations of attribute sets, attributes, and contexts in accordance with the present invention is substantially improved since type checking error detection mechanisms provided by the particular computer instruction language in which the attribute sets, attributes, and contexts are implement remain intact and in effect. In addition, attempted access to a value of an attribute which is undefined for an attribute set of a particular context is detected as an error as described more completely below. The present invention, a preferred embodiment of which is described below, represents a significant improvement over conventional methods and systems including property lists.

The inter-relationships between attribute sets, attributes, and contexts is most easily described in terms of an illustrative example. An attribute set is a collection of attributes which can coexist in a single context and are typically logically related in that the attributes can generally be combined to define the state of a single thing. Of course, it is appreciated that attributes which are logically and otherwise unrelated can be included in a single attribute set. As an example of logically related attributes in an attribute set, an attribute set "as_font" designed for use in describing text styles can include attributes describing a font family, e.g., "Times" or "Helvetica", a size, a slant, and a weight. Each of these attributes defines a data element of a context and values are assigned to these attributes only within a context. For example, a first context of attribute set as_font is established to specify the text style of a header of a document and a second context of attribute set asfont is established to specify the text style of the body of the document. Both contexts have a font family attribute, but the values of the font family attribute within the respective contexts can differ. For example, the font family attribute of the first context can have the attribute value "Times" and the font family attribute of the second context can have the attribute value "Courier." Thus, in a context, attributes of the attribute set of the context can have specific attribute values. In the preferred embodiment, an attribute can be defined for at most one attribute set and a context can include attribute values corresponding to attributes of at most one attribute set.

Figure 2:
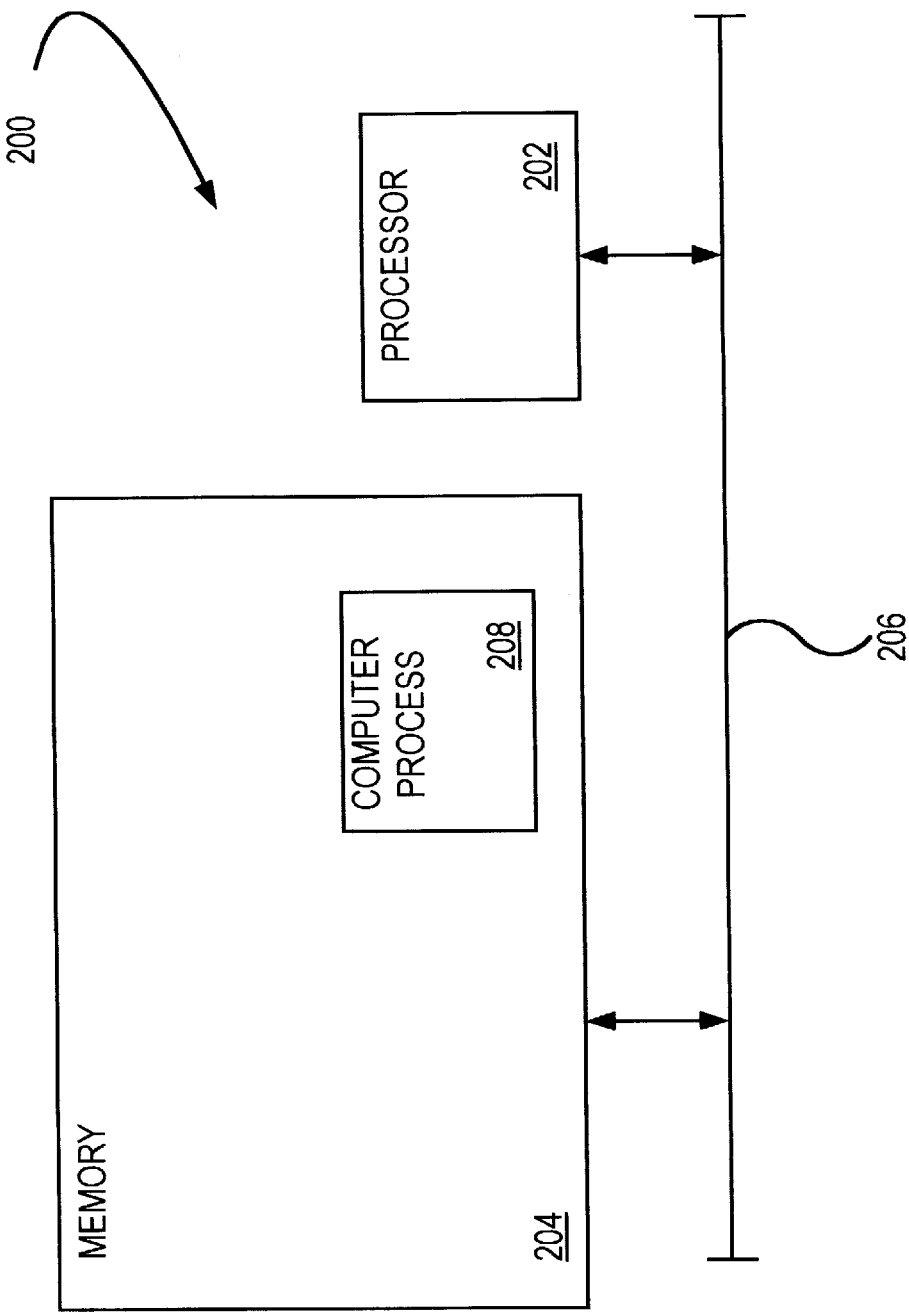
FIG. 2 is a block diagram of a computer system in which a computer process implementing and using attribute sets, attributes, and contexts in accordance with the present invention executes.

In accordance with the present invention, attributes, attribute sets, and contexts are used to store data in and retrieve data from a memory in a computer system. Many computer systems are in use today, most of which generally comport with the organization of computer system 200 as shown in FIG. 2. Computer system 200 includes a processor 202 which fetches instructions from a memory 204 through a bus 206. Processor 202 also retrieves data from and stores data in memory 204 through bus 206. Processor 202 can be, for example, the SPARC processor available from Sun Microsystems, Inc. of Mountain View, Calif. Memory 204 can include any type of memory including, without limitation, randomly accessible memory (RAM), read-only memory (ROM), and secondary storage devices such as magnetic and optical disks. Computer system 200 can be, for example, the SPARCstation workstation computer system which is also available from Sun Microsystems, Inc.

In computer system 200, a computer process 208 executes in processor 202 from memory 204. Computer process 208 uses attributes, attribute sets, and contexts which are formed in memory 204 as described below in conjunction with FIG. 1. Before discussion of attributes, attribute sets, and contexts in accordance with the present invention, a brief discussion of the development of computer processes such as computer process 208 (FIG. 2) and the detection of errors during the development of such computer processes is helpful.

Computer process 208 is initially formed by a computer engineer (not shown) who combines computer instructions of a computer instruction language in a form intelligible to humans. These computer instructions in this form are generally collectively referred to as source code. Another computer process (not shown), which is generally referred to as a compiler, parses the computer instructions of the source code and translates those computer instructions into computer instructions in a form which is appropriate for fetching and execution by processor 202. The computer instructions in this latter form are generally collectively referred to as object code. The act of translating source code to object code is generally referred to as compiling. During compilation, the compiler checks the syntax of the source code and ensures that the source code adheres to rules of the computer instruction language which are enforced by the compiler. Any errors detected in the source code are reported to the computer engineer and can cause the translation of the source code into object code to fail. Some errors go undetected by the compiler and are detected during execution of the resulting object code in processor 202 or go undetected altogether and cause the resulting object code to behave in an undesired fashion during execution in processor 202.

As described briefly above, computer process 208 (FIG. 2) implements attributes, attribute sets, and contexts in accordance with the present invention. Attribute set 100 (FIG. 1) includes a next field 102 and an allocate procedure 104. Allocate procedure 104 assigns to newly allocated attributes which are associated with attribute set 100 accessors which are unique with respect to accessors of other attributes of attribute set 100. Accessors are described more completely below. Next field 102 stores data which specifies the accessor to be assigned to the next allocated attribute. Initially, no attributes are associated with attribute set 100 and next field 102 stores an integer whose value is zero in one embodiment.

FIG. 1 also shows an attribute 110 which is allocated from and is therefore associated with attribute set 100. Attribute 110 includes an index field 112 and attribute access procedures including a set procedure 114 and a get procedure 116. Index field 112 stores the accessor of attribute 110. An accessor is a value which specifies a location at which a particular attribute value is stored within a collection of one or more attribute values. In one embodiment, an accessor is an index into an array. Arrays are known components of the known C++ computer instruction language and are not described herein. In an alternative embodiment, an accessor is an offset into a block of memory 204 to a location at which the attribute value is stored.

During the initialization of attribute 110, the accessor stored in next field 102 is copied to index field 112 of attribute 110 by invocation of allocate procedure 104 of attribute set 100. The accessor stored in next field 102 is then set to a value which is to be stored in the next field of the next initialized attribute of attribute set 100. In one embodiment, the accessor value stored in next field 102 is incremented after each attribute of attribute set 100 is initialized. Thus, after attribute 110 is initialized, index field 112 stores an integer whose value is zero and next field 102 stores an integer whose value is one. It is appreciated that, in this particular embodiment, next field 102 stores an integer whose value indicates the number of attributes that have been allocated by attribute set 100.

Set procedure 114 accepts two arguments as input data. The first argument identifies a context, which is described below in greater detail. The second argument is data representing a value to be assigned to attribute 110 in the identified context. The type of the second argument is specified to invoke inherent type checking error detection mechanisms in the computer instruction language in which set procedure 114 is implemented. For example, the following source code excerpt, which comports with the standard and known C++ computer instruction language, specifies the number and type of arguments accepted as input and the type of results produced as output of an illustrative example of set procedure 114.

void set(Context *c, char *v);     (3)

To set the value of attribute 110 within a specific context, execution of set procedure 114 of attribute 110 in processor 202 (FIG. 2) is invoked supplying as arguments the specific context and data whose value is to be assigned to attribute 110 within the specified context. The following source code excerpt illustrates an invocation of set procedure 114.

Context fontDescl;     (4)

family.set(&fontDesc 1 ,"Times");

If data of a type other than "char *" is supplied as the second argument, a type mismatch is recognized during compilation of set procedure 114 since "char *" is specified as the type of the second argument in source code excerpt (3) above. Thus, advantages provided by inherent type checking error detection mechanisms of the computer instruction language in which attribute sets are implemented remain in effect.

Attribute 110 also includes a get procedure 116, execution of which retrieves and returns the attribute value of attribute 110 in a specified context. In a manner similar to that described above with respect to set procedure 114, get procedure 116 specifies the type of data representing the attribute value of attribute 110 within a context. For example, the following source code excerpt specifies the number and type of arguments accepted as input and the type of results produced as output of an illustrative example of get procedure 116.

char*get(const Context *c) const;     (5)

The type of the returned value is specified as "char *" in source code excerpt (5). Therefore, data of the type "char *" is returned by invocation of get procedure 116. The following source code excerpt illustrates invocation of get procedure 116.

Context fontDesc 1;     (6)

char *fontFamily=family.get(&fontDescl);

Thus, the attribute value of attribute 110 within a context is stored in and retrieved from the context by invocation of set procedure 114 and get procedure 116, respectively, while supplying the context as an argument.

This paradigm is fundamentally distinct from conventional use of property lists, as shown above, in which set and get procedures are associated with the property list, designated by "pl" in source code excerpts (1) and (2) above, and the relevant property is specified by a property name supplied as an argument. Conventionally, the initial concept is one of a collection of data elements which collectively represent a state. Accordingly, the property list is defined to include a number of properties. Access procedures for accessing individual properties within the property list are associated with the property list and accept as an argument specification of which property of the list is accessed.

However, in accordance with the present invention, the initial concept is that of the attribute which defines a data element which can be an informational component of a state. Therefore, access procedures by which an attribute value of the attribute is accessed within a context are associated with the attribute and the context is accepted as an argument. An attribute is specified by an identifier and has a data type which is defined using conventional constructs of a conventional computer instruction language such as C++. Thus, as described above with respect to source code excerpts (3) through (6), conventional type checking error detection mechanisms provided by the computer instruction language remain effective to detect type mismatch errors. As described above more completely, such type checking error detection mechanisms are not automatically invoked by conventional property lists and must generally be superimposed upon the computer instructions if used at all by the computer engineer.

FIG. 1 shows a context 130 which includes a collection 134 of attribute values, e.g., attribute values 134A and 134B. In this embodiment, attribute values 134A and 134B are a pointer to text 136 and a number, respectively. As described above, attribute 110 includes an index field 112 which contains an accessor whose value is zero. In one embodiment, collection 134 is an array and the accessor of index field 112 is an index to the element of collection 134 which is the attribute value representing attribute 110. In another embodiment, the accessor of index field 112 is an offset into collection 134 to the specific location at which attribute value 134A is found. Since the accessor of index field 112 has a value of zero, attribute value 134A, which is the first attribute value of collection 134, is the attribute value of attribute 110 within context 130. Since attribute value 134A is a pointer to text 136, whose value is "Times," context 130 includes data specifying a font family of "Times" as defined by attribute 110 and attribute value 134A.

Context 140 is generally analogous to context 130 as described above but includes an attribute set field 142 in addition to a collection 144 of attribute values. Context 140 is a checked context and includes attribute set field 142 for additional error detection capabilities as described more completely below. Attribute set field 142 contains data specifying attribute set 100 as the attribute set with which context 140 is associated. Collection 144 includes attribute values 144A and 144B which are pointers to text 146 and number 148, respectively. Since the accessor of index field 112 has a value of zero, attribute value 144A, which is the first attribute value of collection 144, is the attribute value of attribute 110 within context 140. Since attribute value 144A is a pointer to text 146, whose value is "Helvetica," attribute 110 has a value of "Helvetica" in context 140.

It should be noted that the accessor of index field 112 of attribute 110 specifies the location within collection 134 and collection 144 and corresponding collections of attribute values for all contexts associated with attribute set 100 at which respective attribute values corresponding to attribute 110 are stored. Since a single field specifies the location within a collection of attribute values a particular attribute is stored, the collections of attribute values of all context associated with a single attribute set are both ordered and of uniform organization. Thus, the inefficiencies inherent in linear searches of unordered lists are avoided by attributes implemented and used in accordance with the present invention. Instead, an attribute value corresponding to attribute 110 and stored within any context associated with attribute set 100 can be accessed directly by reference to the accessor stored in index field 112.

In addition to attribute 110, attribute set 100 includes an attribute 120. Attribute 120 is directly analogous to attribute 110 and includes an index field 122 which is set by attribute set 100 when attribute 120 is allocated in the manner described above with respect to attribute 110. As described more completely below, attribute 120, as well as attribute 110, can be allocated at run time and after creation of contexts 130 and 140. After allocation of attribute 110, next field 102 of attribute set 100 has a value of one. In allocating attribute 120 in accordance with allocate procedure 104, the accessor of next field 102 is copied to index field 122 and the accessor of next field 102 is incremented to a value of two. Index field 122 therefore contains an accessor whose value is one. Attribute 120 also includes a set procedure 124 and a get procedure 126. Set procedure 124 defines an operation by which an attribute value for attribute 120 is stored within a context and is directly analogous to set procedure 114 of attribute 110 with the exception that the second argument, which represents the value of attribute 120 to be stored, is defined to be of the data type "int" which is an integer. Get procedure 126 defines an operation by which data representing an attribute value of attribute 120 is retrieved from a context and is directly analogous to get procedure 116 of attribute 110 with the exception that the returned value, which represents the retrieved value of attribute 120, is also defined to be of the type "int."

Since index field 122 contains an accessor whose value of one, attribute values representing values of attribute 120 are offset by one position from the beginning of collections 134 and 144 of contexts 130 and 140, respectively. The second attribute value of collection 134 is attribute value 134B. Attribute value 134B, whose value is 12, therefore represents the value of attribute 120 in context 130. The second attribute value of collection 144 is attribute value 144B and points to number 148. Number 148, whose value is 14, therefore represents the value of attribute 120 in context 140.

In addition to type checking error detection which is afforded by the present invention as described above, access to attribute values as stored in the structures shown in FIG. 1 is particularly efficient. As described above, a property value is located within a conventional property list by effecting a number of comparisons of alphanumeric data. The number of comparisons is directly related, typically proportionally, to the length of the conventional property list, and several processor clock cycles can be required to perform each comparison of alphanumeric data. In accordance with the present invention, a particular attribute value of collection 134, for example, can be located very quickly by calculating the precise location within collection 134 specified by the accessor of the index field of the attribute. Accordingly, the time required to locate a particular attribute value of collection 134 is largely independent of the number of attribute values stored in collection 134 and of the particular position within collection 134 at which the particular attribute value is stored. As a result, use of attributes, attribute sets, and contexts in accordance with the present invention frequently results in very substantial performance improvement relative to use of conventional property lists in the same computer process.

To further illustrate the concepts of the present invention, a specific implementation of the present invention in the C++ computer instruction language is described below. The C++ computer instruction language is well-known and is not described herein. Attributes are allocated by an attribute set, which is an instance of the class AttrSet as defined in the C++ computer instruction language in one embodiment by the following source code excerpt. Classes, instances of and membership of classes, and inheritance are known features of the known C++ computer instruction language and are not described herein. Such features of the known C++ computer instruction language are described, for example, in Margaret A. Ellis and Bjarne Stroustrup, *The Annotated C++ Reference Manual* (Addison-Wesley Publishing 1991).

```
1:  class AttrSet {                                           (7)
2:  public:
3:      AttrSet();
4:      ~AttrSet() {}
5:      int allocate { return index++; }
6:      int operator==(const AttrSet &ns) const { return
            cookie==ns.cookie; }
7:  private:
8:      int index;
9:      const int *cookie;
10: };
```

While it is appreciated that the C++ computer instruction does not typically include line numbers as shown in source code excerpt (7) and in source code excerpts which follow, line numbers are added for clarity in the following discussion. When source code excerpt (7) is used to define the class of which attribute set 100 (FIG. 1) is an instance, next field 102 is defined at line 8 of source code excerpt (7). Allocate procedure 104 is defined at line 5 and, when executed in process 202 (FIG. 2), returns the value of next field 102 (FIG. 1) and then increments the value of next field 102.

The following souce code excerpt initializes elements of the class AttrSet of which attribute set 100 (FIG. 1) is an instance.

```
AttrSet::AttrSet() : index(0), cookie((int *)this){ }          (8)
```

Next field 102, which is defined by the element index, is initialized to have a value of zero, and the element cookie, which is used for comparisons between attribute sets as defined at line 6 of source code excerpt (7), is initialized to the address of attribute set 100 within memory 204. Thus, two attribute sets are equal only if their respective addresses within memory 204 are equal. Attribute set 100 is allocated and initialized by execution within processor 202 (FIG. 2) of the computer instruction

```
AttrSet as_font;                                               (9)
``` which defines attribute set 100 as an instance of the class AttrSet and assigns to attribute set 100 the identifier "as_font."

The following source code excerpt defines the class Attr in the C++ computer instruction language and defines the structure and behavior of attributes 110 and 120. It is should be noted that the class Attr in this embodiment inherits from the class GenericAttr which is described more completely below. Briefly, the class GenericAttr defines the behavior of an attribute in the absense of type checking error detection mechanisms and therefore provides for relatively uniform behavior of attributes regardless of the particular data type of a particular attribute.

```
1:  template<class T>                                          (10)
2:  class Attr: public GenericAttr {
3:  public:
4:      Attr(AttrSet as) : GenericAttr(as) {}
5:      ~Attr() {}
6:
7:      void set(Context *c, T v) { GenericAttr::set(c, (void *)v); }
8:      T get(const Context *c) const { return
            (T)GenericAttr::get(c);}
```

-continued

```
 9:
10: private:
11:     Attr() GenericAttr(0) {} // disallow malformed attributes
12: };
```

Source code excerpt (10) uses templates, which are known features of the known C++ computer instruction language, to provide the type checking error detection described above. For example, attribute 110 (FIG. 1) can be defined by the computer instruction Attr<char *>family(&as font);                           (11)

in which as_font is previously defined to be an instance of class AttrSet as defined above.

Attribute 110 is assigned the identifier "family" and is an instance of the class Attr as defined in source code excerpt (10) above. By operation of the known templates feature of the known C++ computer instruction language, attribute 110 is defined as if "char *" substituted for "T" throughout in source code excerpt (10). Specifically, with respect to attribute 110, lines 7 and 8 of source code excerpt (10) are functionally equivalent to the following.

```
7:  void set(Context *c, char *v)                           (12)
        { GenericAttr::set(c, (void *)v); }
8:  char *get(const Context *c) const { return
        (char *)GenericAttr::get(c); }
```

Lines 7 and 8 of source code excerpt (12) define the signature of set procedure 114 and get procedure 116, respectively, of attribute 110. Therefore, to store an attribute value corresponding to attribute 110 within a context, the computer instruction family.set(&fontDesc1,"Times");                         (13)

is issued, in which "fontDescl" identifies the context. To retrieve the attribute value corresponding to attribute 110 within a context, the computer instruction char*fontFamily=family.get(&fontDescl);                 (14)

is issued. Attribute 120 (FIG. 1) can be defined by the computer instruction

Attr<int>size(&as_font);                                (15)

in which as_font is previously defined to be an instance of class AttrSet as defined above. With respect to attribute 120, lines 7 and 8 of source code excerpt (10) are functionally equivalent to the following.

```
7:  void set(Context *c, int v)                             (16)
        { GenericAttr::set(c, (void *)v); }
8:  int get(const Context *c) const { return
        (int)GenericAttr::get(c); }
```

Lines 7 and 8 of source code excerpt (16) define the signature of set procedure 124 and get procedure 126, respectively, of attribute 120. Therefore, to store an attribute value corresponding to attribute 120 within a context, the computer instruction size.set(&fontDescl,12);                                (17)

is issued, in which "fontdescl" identifies the context. To retrieve the attribute value corresponding to attribute 120 within a context, the computer instruction int fontSize=size.get(&fontDesc1);                      (18)

is issued.

As specified in line 2 of source code excerpt (10), class Attr inherits from the class GenericAttr which is defined according to the following source code excerpt.

```
//----------------------------------------------------     (19)
/* Attrs keep how to obtain values from Context instances. The
   GenericAttr classes are not for direct public use. Instead, create your
   own subclasses using the parameterized class that follows.
   Never allocate Attrs on the stack. Preferably allocate them via static
   construction (i.e., in the data segment). If allocated on the heap, never
   delete them. If you are going to allocate on the stack anyway, never
   exit that stack frame. See the constructor.
*/----------------------------------------------------
 1: class GenericAttr
 2: protected:
 3:     GenericAttr(AttrSet *as);
 4:     virtual ~GenericAttr();
 5:
 6:     void set(Context *c, void *v);
 7:     void *get(Const Context *c) const;
 8:
 9:     // All copies share same attrset and index
10:     GenericAttr(const GenericAttr &a);
11:
12: private:
13:     GenericAttr(); // disallow malformed attributes
14:
15:     const AttrSet *attrset;
16:     int index;
17: };
```

The following source code excerpt further defines the behavior of instances of the class GenericAttr, which includes instances of the class Attr as described above.

```
 1: GenericAttr::GenericAttr(AttrSet *as):attrset(as) {      (20)
 2:     index = as->allocate();
 3: }
 4:
 5: GenericAttr::~GenericAttr() {}
 6: void
 7: GenericAttr::set(Context *c, void *v) {
 8:     c->set(attrset, index, v);
 9: }
10:
11: void
12: GenericAttr::get(const Context *c) const {
13:     return c->get(attrset, index);
14: }
15:
16: // All copies share same attrset and index
17: GenericAttr::GenericAttr(const GenericAttr &a):
        attrset(a. attrset), index(a.index) {}
18:
19: GenericAttr::GenericAttr(): attrset(O) {}
```

Context 130 is an instance of the class Context as defined in the following source code excerpt.

```
 1: class Context                                           (21)
 2: public:
 3:     Context(const AttrSet *) {}
 4:     virtual Context();
 5:     virtual void set(const AttrSet *, int index void *value);
 6:     virtual void *get(Const AttrSet *, int index) const;
 7: protected:
```

```
8:      Seq<void *>elts;
9:      Context() {}
10: };
```

As shown at line 8 of source code excerpt (21), a context has a sequence of elements identified as "elts." For example, contexts 130 and 140 include collections 134 and 144, respectively, which, in this embodiment, are sequences defined in the C++ computer instruction language. Sequences are data structures which, in one embodiment, expand themselves as needed during execution of computer process 208. In an alternative embodiment, a maximum number of attributes of a particular attribute set is established and sequences of contexts of the particular attribute set are arrays whose number of elements is the maximum number of attributes.

In one embodiment, a sequence is an array which, prior to accessing an element at a specified position within the array, first verifies that the array is sufficiently large to include the element at the specified position. If the array is sufficient large, the element is accessed. Conversely, if the array is not sufficiently large, a new array which is sufficiently large is created and the contents of the initial array are copied into the new, larger array. After the contents are copied, the portion of memory 204 used by the initial array is deallocated.

Elements of the sequence elts are of the type "void *" of the known c++ computer instruction language and can therefore each be used as a pointer to data of any type or to contain data of any type whose size is that of a "void *" pointer. The following source code excerpt further defines the behavior of contexts, e.g., contexts 130 and 140.

```
1: Context::~Context(){}  //virtual                        (22)
2:
3: void
4: Context::set(const AttrSet *, int index, void *value) {
5:      elts[index]=value;
6: }
7:
8: void *
9: Context::get(const AttrSet *, int index) const {
10:     return elts.get_elem(index);
11: }
```

The procedure get_elem invoked at line 10 of source code excerpt (22) returns a reference to the element of the sequence elts at the location specified by the argument index. A reference is a known component of the known C++ computer instruction language and is not described herein. Context 130 is defined as a context corresponding to attribute set 100 by execution of the computer instruction Context fontDesc1(&as_font),                           (23)

within processor 202 (FIG. 2). Context 140 (FIG. 1) is defined as a context corresponding to attribute set 100 by execution of the computer instruction CheckedContext fontDesc2(&as_font);                    (24)

within processor 202 (FIG. 2). Context 140 is therefore an instance of the class CheckedContext which is described more completely below. When using attributes and checked contexts in accordance with the present invention in designing a computer process, an error occurs as a result of attempted access within a context of an attribute value corresponding to an attribute which is undefined in the attribute set of the context. The following computer instruction is illustrative.

address.set(&fontDesc2, "1234 Main Street");           (25)

An attribute can be undefined for a particular attribute set, e.g., attribute set 100, in generally two distinct ways, each of which is detected by a different error detection mechanism. First, the attribute can be undefined for all attribute sets. Since no attribute whose identifier is "address" is defined for any attribute set, the procedure address.set is undefined and the error is detected by conventional error detection mechanisms of the C++ computer instruction language. Second, the attribute can be defined for a different attribute set but not for the particular attribute set, e.g., attribute set 100. Suppose, for example, that an attribute whose identifier is "address" is defined within an attribute set other than attribute set 100. In such a situation, the procedure address-.set is defined and execution of the computer instruction of source code excerpt (25) invokes this procedure. To provide for detection of this particular error in the latter situation, the class CheckedContext is defined by the following source code excerpt and can be used in place of the class Context as defined above.

```
1: class CheckedContext : public Context {                 (26)
2: public:
3:    CheckedContext(const AttrSet *as) : Context(as), attrset(as) {}
4:    ~CheckedContext();
5:
6:    virtual void set(const AttrSet *as, int index, void *value);
7:    virtual void *get(const AttrSet *as, int index) const;
8: protected:
9:    const AttrSet *attrset;
10: private:
11:    CheckedContext();
12: };
```

The presence of the C++ qualifier "virtual" in source code excerpts (21) and (26) ensure that the definitions of the procedures get and set in the class Context are superseded by the procedures get and set, respectively, defined in the class CheckedContext. The behavior of an instance of the class CheckedContext is further defined by the following source code excerpt.

```
1: CheckedContext::~CheckedContext() {} // virtual         (27)
2: void
3: CheckedContext::set(const AttrSet *as, int index, void *value) {
4:      if(as == attrset) {
5:           elts[index] = value;
6:      } else {
7:           abort();
8:      }
9: }
10:
11: void
12: CheckedContext::get(const AttrSet *as, int index) const {
13:      if (as == attrset) {
14:           return elts.get_elem(index);
15:      } else {
16:           abort();
17:      }
18: }
```

Figure 3:
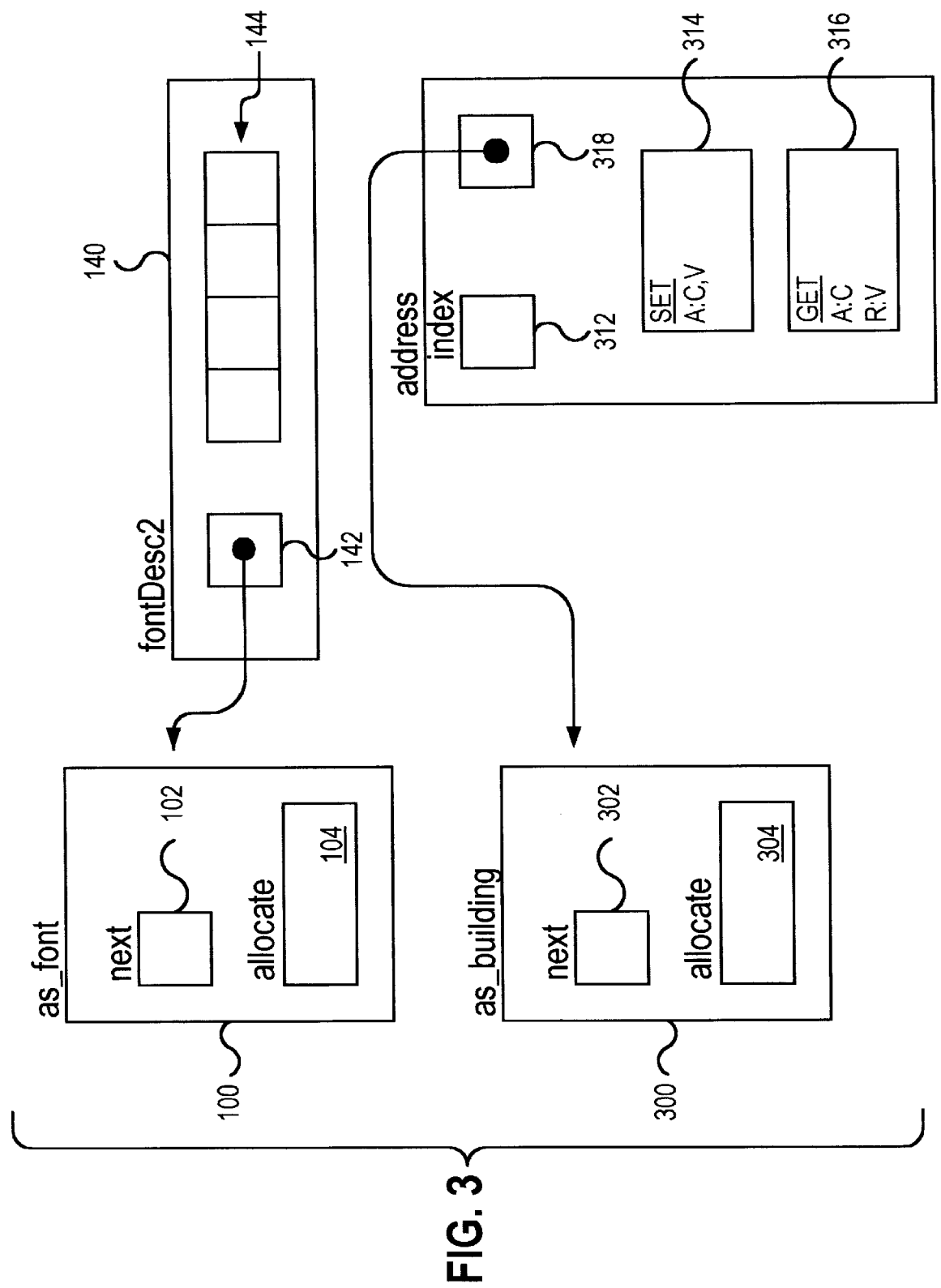
FIG. 3 is a block diagram of a context and an attribute of different respective attribute sets to illustrate an error detected by checked contexts in accordance with the present invention.

At lines 4 and 13 of source code excerpt (27), the attribute set specified by the first argument of set and get procedures, respectively, is compared to the attribute set to which the instance of class CheckedContext corresponds. The particular error detected by such a comparison is the attempted storing or retrieval of an attribute value within a context for an attribute which is not defined within the attribute set of the context. This error is detected when the attribute set corresponding to the context is not the same attribute set which includes the attribute whose value is stored or retrieved. In the example described above which is illustrated in FIG. 3, an error is detected if a set procedure 314 of an attribute 310, which is part of attribute set, is executed with the first argument specifying context 140 as the context within which the attribute is to be set. The error is detected by comparison of attribute set field 142 of context 140 and attribute set field 318 of attribute 310. Since context 140 and attribute 310 are associated with different attribute sets, index field 312 of attribute 310 does not specify the location within collection 144 of an attribute value corresponding to attribute 310. If such a condition is detected, processing is transferred to a procedure called "abort," which terminates processing of the computer process in which the error is detected. In an alternative embodiment, the exception handling mechanisms provided by the known C++ computer instruction language can be invoked when this particular error is detected.

Once the classes described above are defined, use of attribute sets in accordance with the present invention is quite simple and uncomplicated. The following five (5) computer instructions define the structures shown in FIG. 1.

```
1: AttrSet as_font,                         (28)
2: Attr<char *>family(&as_font);
3: Attr<int>size(&as_font);
4: Context fontDesc1(&as_font);
5: CheckedContext fontDesc2(&as_font);
```

Inclusion of line 1 of source code excerpt (28) in computer process 208 (FIG. 2) allocates attribute set 100 (FIG. 1) and defines allocate procedure 104. Execution of line 1 initializes attribute set 100 and initializes next field 102 to have a value of zero. Inclusion of line 2 in computer process 208 (FIG. 2) allocates attribute 110 (FIG. 1) and defines set procedure 114 and get procedure 116. Execution of line 2 initializes index field 112 to the value of next field 102, i.e., to zero, and increments next field 102 to have a value of one. In addition, attribute set field 118 is initialized to point to attribute set 100. Inclusion of line 3 in computer process 208 (FIG. 2) similarly allocates attribute 120 (FIG. 1), and execution of line 3 similarly initializes attribute 120.

Inclusion of line 4 in computer process 208 (FIG. 2) allocates context 130 (FIG. 1). Specifically, collection 134 is allocated. In addition, procedures for retrieving attribute values from and for storing attribute values in collection 134 are defined. Similarly, inclusion of line 5 in computer process 208 (FIG. 1) allocates context 140 (FIG. 1) including attribute set field 142 which points to attribute set 100. While it is shown that lines 2 and 3 precede lines 4 and 5 and therefore allocate and define attributes 110 and 120 prior to allocation and definition of contexts 130 and 140, it is appreciated that the order of lines 2–5 is unimportant. In fact, line 3, for example, of source code excerpt (28) can be included in computer process 208 (FIG. 2) much later than the remainder of source code excerpt (28) so long as no access to an attribute value of attribute 120 is attempted prior to execution of the computer instruction of line 3 of source code excerpt (28). Access within a context of attribute set 100 to attribute values of attributes other than attribute 120 can be properly made prior to execution of the computer instruction of line 3 of source code excerpt (28). Line 2 is analogous to line 3 and the foregoing is equally applicable to line 2 of source code excerpt (28).

The following two computer instructions, when executed within processor 202 (FIG. 2), store and retrieve, respectively, data stored within context 130 as the attribute value of attribute 110.

```
family.set(&fontDesc 1 ,"Times");           (29)
char*fontFamily=family.get(&fontDesc1);
```

As described above, the procedures family.set and family.get are typed and therefore invoke the type checking error detection mechanisms provided by the known C++ computer instruction language. As further described above, the procedures family.set and family.get do not rely on comparisons of alphanumeric data or on numerous comparisons to determine which of the attribute values of collection 134 to store or retrieve. Instead, an offset, e.g., index field 112 which is retrieved from attribute 110, defines the precise location within collection 134 at which the relevant attribute value is found. Therefore, access to specific attribute values according to the present invention is considerably more efficient that prior art methods as described above.

The above description is illustrative only and is not limiting. Instead, the present invention is limited only by the claims which follow.

What is claimed is:

1. A method for accessing a data element in a memory of a computer system, the method comprising:

forming in the memory an attribute which defines the data element;

including the attribute in an attribute set structure which includes zero or more other attributes and to which additional attributes can subsequently be added;

forming in the memory one or more contexts, each of which can include a value of the data element;

including in the attribute an access procedure, execution of which accesses the value of the data element within a selected one of the one or more contexts; and executing the access procedure while specifying the selected context to thereby access the value of the selected context.

2. The method of claim 1 further comprising:

including in the attribute a data type according to which values of the data element are accessed.

3. The method of claim 1 further comprising:

including in the attribute an accessor which specifies a location within each of the contexts of the respective values of the data element.

4. The method of claim 1 wherein execution of the access procedure stores the value in the selected context.

5. The method of claim 1 wherein execution of the access procedure retrieves the value from the selected context.

6. The method of claim 1 wherein the step of executing the access procedure comprises:

supplying as an argument the selected context.

7. The method of claim 1 further comprising:

detecting as an error condition an attempted access from within the selected context of a value of an attribute which is not included in the attribute set structure.

8. The method of claim 1 further comprising:

associating the selected context with the attribute set structure.

9. The method of claim 8 further comprising:

detecting as an error condition an attempted access from within the selected context of a value of an attribute which is included in a second attribute set structure, which is different from the first-mentioned attribute structure.

10. The method of claim 1 further comprising:

including in each of the contexts at most one value for each of the attributes included in the attribute set structure, the attributes including the attribute, the other attributes, and the additional attributes.

11. A method for accessing a data element in a memory of a computer system, the method comprising:

forming in the memory an attribute which defines the data element;

including the attribute in an attribute set structure which includes zero or more other attributes;

including in the attribute an accessor which specifies a location within a context of a value of the data element; and accessing a value of the data element within a context, the step of accessing comprising:

accessing the value from within a specified context at the location specified by the accessor.

12. The method of claim 11 wherein one or more additional attributes can be added to the attribute set structure.

13. The method of claim 11 wherein the accessor is an array index.

14. The method of claim 11 wherein the accessor is an offset into a collection of one or more values within the context which correspond to one or more respective data elements.

15. The method of claim 11 further comprising:

including in the attribute an access procedure, execution of which accesses the value of the data element within the context; and executing the access procedure while specifying the context to thereby access the value of the data element.

16. The method of claim 15 further comprising:

including in the attribute a data type according to which values of the data element are accessed.

17. The method of claim 11 wherein the accessor specifies a location within a collection of one or more values within the context.

18. The method of claim 11 further comprising:

detecting as an error condition an attempted access of a value from within the specified context of an attribute which is not included in the attribute set structure.

19. The method of claim 11 further comprising:

associating the specified context with the attribute set structure.

20. The method of claim 19 further comprising:

detecting as an error condition an attempted access from within the specified context of a value of an attribute which is included in a second attribute set structure, which is different from the first-mentioned attribute structure.

21. A structure for maintaining state information in a memory of a computer system, the structure comprising:

one or more contexts, each of which can include a value of a data element of the state;

an attribute, which is operatively coupled to the contexts and which is formed in the memory and which defines the data element, the attribute comprising:

an access procedure, execution of which accesses the value of the data element within a specified one of the contexts;

an attribute set structure which includes the attribute and zero or more other attributes; and means, operatively coupled to the attribute set structure, for adding one or more additional attributes to the attribute set structure.

22. The structure of claim 21 wherein the attribute further comprises:

a data type, operatively coupled to the access procedure, according to which the value of the data element is accessed.

23. The structure of claim 21 wherein the attribute further comprises:

an accessor operatively coupled to the access procedure; and further wherein the access procedure accesses the value of the attribute within the specified context by accessing a position specified by the accessor within a collection of at most one value for each of one or more attributes.

24. The structure of claim 21 wherein execution of the access procedure stores the value of the data element in the specified context.

25. The structure of claim 21 wherein execution of the access procedure retrieves the value of the data element from the specified context.

26. The structure of claim 21 further comprising:

an error detection mechanism, operatively coupled to the access procedure, for detecting as an error condition an attempted access of a value from within the specified context of an attribute which is not included in the attribute set structure.

27. The structure of claim 21 wherein the specified context further comprises:

an association with the attribute set structure.

28. The structure of claim 27 wherein the association of the specified context is a pointer to the attribute set structure.

29. The structure of claim 27 further comprising:

an error detection mechanism, operatively coupled to the access procedure and to the association of the specified context with the attribute set structure, for detecting as an error condition an attempted access from within the specified context of a value of an attribute which is included in a second attribute set structure, which is different from the first-mentioned attribute structure.

30. A structure for maintaining state information in a memory of a computer system, the structure comprising:

an attribute set structure which is formed in the memory and which includes one or more attributes, wherein each of the attributes defines a respective data element of the state and comprises:

an accessor which specifies a location within each of one or more contexts, each of which comprises at most one data element value for each of the attributes, at which a value of the data element of the attribute is located.

31. The structure of claim 30 further comprising:

means, operatively coupled to the attribute set structure, for adding one or more additional attributes to the attribute set structure.

32. The structure of claim 30 wherein the accessor of each attribute is an array index.

33. The structure of claim 30 wherein the accessor is an offset into the at most one value of each of the attributes within the context.

34. The structure of claim 30 wherein each of the attributes further comprises:
an access procedure, which is operatively coupled to the accessor and execution of which accepts specification of a selected one of the contexts and accesses the value of the data element within the selected context.

35. The structure of claim 34 wherein the attribute further comprises:
a data type, operatively coupled to the access procedure, according to which the value of the data element is accessed.

36. The structure of claim 34 further comprising:
an error detection mechanism, operatively coupled to the access procedure, for detecting as an error condition an attempted access of a value from within the specified context of an attribute which is not included in the attribute set structure.

37. The structure of claim 34 wherein the specified context further comprises:
an association with the attribute set structure.

38. The structure of claim 37 wherein the association of the specified context is a pointer to the attribute set structure.

39. The structure of claim 37 further comprising:
an error detection mechanism, operatively coupled to the access procedure and to the association of the specified context with the attribute set structure, for detecting as an error condition an attempted access from within the specified context of a value of an attribute which is included in a second attribute set structure, which is different from the first-mentioned attribute structure.

40. A computer-readable memory which includes a structure for maintaining state information in a computer system, the structure comprising:
one or more contexts in the memory, each of which can include a value of a data element of the state;
an attribute in the memory, which is operatively coupled to the contexts and which defines the data element, the attribute comprising:
an access procedure, execution of which accesses the value of the data element within a specified one of the contexts;
an attribute set structure in the memory which includes the attribute and zero or more other attributes; and
means, operatively coupled to the attribute set structure, for adding one or more additional attributes to the attribute set structure.

41. The memory of claim 40 wherein the attribute further comprises:
a data type, operatively coupled to the access procedure, according to which the value of the data element is accessed.

42. The memory of claim 40 wherein the attribute further comprises:
an accessor operatively coupled to the access procedure; and
further wherein the access procedure accesses in the memory the value of the attribute within the specified context by accessing a position specified by the accessor within a collection in the memory of at most one value for each of one or more attributes.

43. The memory of claim 40 wherein execution of the access procedure stores the value of the data element in the specified context.

44. The memory of claim 40 further comprising:
an error detection mechanism in the memory, operatively coupled to the access procedure, for detecting as an error condition an attempted access of a value from within the specified context of an attribute which is not included in the attribute set structure.

45. The memory of claim 40 wherein the specified context further comprises:
an association in the memory with the attribute set structure.

46. The memory of claim 45 further comprising:
an error detection mechanism in the memory, operatively coupled to the access procedure and to the association of the specified context with the attribute set structure, which detects as an error condition an attempted access of the memory within the specified context of a value of an attribute which is included in a second attribute set structure, which is different from the first-mentioned attribute structure.

47. The memory of claim 40 wherein execution of the access procedures retrieves the value of the data element from the specified context.

48. A computer-readable memory in which a structure maintains state information in a computer system, the structure comprising:
an attribute set structure which is formed in the memory and which includes one or more attributes, wherein each of the attributes defines a respective data element of the state and each of which comprises:
an accessor which specifies a location within each of one or more contexts in the memory, each of which comprises at most one data element value for each of the attributes, at which a value of the data element of the attribute is located.

49. The memory of claim 48 further comprising:
means, operatively coupled to the attribute set structure, for adding one or more additional attributes to the attribute set structure.

50. The memory of claim 48 wherein the accessor of each attribute is an array index.

51. The memory of claim 48 wherein the accessor is an offset into the at most one value of each of the attributes within the context.

52. The memory of claim 48 wherein each of the attributes further comprises:
an access procedure, which is operatively coupled to the accessor and execution of which accepts specification of a selected one of the contexts and accesses the value of the data element within the selected context.

53. The memory of claim 52 wherein the attribute further comprises:
a data type, operatively coupled to the access procedure, according to which the value of the data element is accessed.

54. The memory of claim 52 further comprising:
an error detection mechanism in the memory, operatively coupled to the access procedure, for detecting as an error condition an attempted access within the memory of a value from within the specified context of an attribute which is not included in the attribute set structure.

55. The memory of claim 52 wherein the specified context further comprises:
an association with the attribute set structure.

56. The memory of claim 55 further comprising:
an error detection mechanism, operatively coupled to the access procedure and to the association of the specified context with the attribute set structure, for detecting as an error condition an attempted access in the memory within the specified context of a value of an attribute which is included in a second attribute set structure, which is different from the first-mentioned attribute structure.

57. A computer system comprising:

a memory;

a structure formed in the memory for maintaining state information in a computer system, the structure comprising:

one or more contexts in the memory, each of which can include a value of a data element of the state;

an attribute in the memory, which is operatively coupled to the contexts and which defines the data element, the attribute comprising:

an access procedure, execution of which accesses the value of the data element within a specified one of the contexts;

an attribute set structure in the memory which includes the attribute and zero or more other attributes; and means, operatively coupled to the attribute set structure, for adding one or more additional attributes to the attribute set structure.

58. The computer system of claim 57 wherein the attribute further comprises:

a data type, operatively coupled to the access procedure, according to which the value of the data element is accessed.

59. The computer system of claim 57 wherein the attribute further comprises:

an accessor operatively coupled to the access procedure; and further wherein the access procedure accesses in the memory the value of the attribute within the specified context by accessing a position specified by the accessor within a collection in the memory of at most one value for each of one or more attributes.

60. The computer system of claim 57 wherein execution of the access procedure stores the value of the data element in the specified context.

61. The computer system of claim 57 further comprising:

an error detection mechanism in the memory, operatively coupled to the access procedure, for detecting as an error condition an attempted access of a value from within the specified context of an attribute which is not included in the attribute set structure.

62. The computer system of claim wherein the specified context further comprises:

an association in the memory with the attribute set structure.

63. The computer system of claim 62 further comprising:

an error detection mechanism in the memory, operatively coupled to the access procedure and to the association of the specified context with the attribute set structure, which detects as an error condition an attempted access of the memory within the specified context of a value of an attribute which is included in a second attribute set structure, which is different from the first-mentioned attribute structure.

64. The computer system of claim 57 wherein execution of the access procedure retrieves the value of the data element from the specified context.

65. A computer system comprising:

a memory;

a structure formed in the memory for maintaining state information in a computer system, the structure comprising:

an attribute set structure which is formed in the memory and which includes one or more attributes, wherein each of the attributes defines a respective data element of the state and each of which comprises:

an accessor which specifics a location within each of one or more contexts in the memory, each of which comprises at most one data element value for each of the attributes, at which a value of the data element of the attribute is located.

66. The computer system of claim 65 wherein the structure further comprises:

means, operatively coupled to the attribute set structure, for adding one or more additional attributes to the attribute set structure.

67. The computer system of claim 65 wherein each of the attributes further comprises:

an access procedure, which is operatively coupled to the accessor and execution of which accepts specification of a selected one of the contexts and accesses the value of the data element within the selected context.

68. The computer system of claim 67 wherein the attribute further comprises:

a data type, operatively coupled to the access procedure, according to which the value of the data element is accessed.

69. The computer system of claim 67 wherein the structure further comprises:

an error detection mechanism in the memory, operatively coupled to the access procedure, for detecting as an error condition an attempted access within the memory of a value from within the specified context of an attribute which is not included in the attribute set structure.

70. The computer system of claim 67 wherein the specified context further comprises:

an association with the attribute set structure.

71. The computer system of claim 70 wherein the structure further comprises:

an error detection mechanism, operatively coupled to the access procedure and to the association of the specified context with the attribute set structure, for detecting as an error condition an attempted access in the memory within the specified context of a value of an attribute which is included in a second attribute set structure, which is different from the first-mentioned attribute structure.

* * * * *